United States Patent
Tsukagishi et al.

(10) Patent No.: US 11,964,540 B2
(45) Date of Patent: Apr. 23, 2024

(54) HEATING APPARATUS FOR VEHICLE, METHOD OF CONTROLLING HEATING APPARATUS FOR VEHICLE, AND STORAGE MEDIUM

(71) Applicants: Toyota Jidosha Kabushiki Kaisha, Toyota (JP); Denso Corporation, Kariya (JP)

(72) Inventors: Kenji Tsukagishi, Toyota (JP); Takahisa Kaneko, Toyota (JP); Masahiro Nishiyama, Toyota (JP); Akihisa Sumiyoshi, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 278 days.

(21) Appl. No.: 16/891,747

(22) Filed: Jun. 3, 2020

(65) Prior Publication Data
US 2020/0391572 A1 Dec. 17, 2020

(30) Foreign Application Priority Data
Jun. 13, 2019 (JP) .................................. 2019-110222

(51) Int. Cl.
*B60H 1/22* (2006.01)
*B60H 1/00* (2006.01)

(52) U.S. Cl.
CPC ....... *B60H 1/2218* (2013.01); *B60H 1/00285* (2013.01); *B60H 1/00292* (2013.01);
(Continued)

(58) Field of Classification Search
CPC .. B60H 1/2218; B60H 1/2226; B60H 1/2227; B60H 1/00285; B60H 1/00292;
(Continued)

(56) References Cited

U.S. PATENT DOCUMENTS 6,072,153 A * 6/2000 Aoki .................... B60H 1/2218
219/202
8,884,191 B2 * 11/2014 Ogino .................. B60N 2/5685
219/217
(Continued)

FOREIGN PATENT DOCUMENTS

CN 112078324 A * 12/2020 ......... B60H 1/00285
DE 10052898 A1 * 7/2001 ............ B60H 1/034
(Continued)

OTHER PUBLICATIONS

JP2010143468A English machine translation (Year: 2010).*

*Primary Examiner* — Jenna M Hopkins
(74) *Attorney, Agent, or Firm* — Dinsmore & Shohl LLP

(57) ABSTRACT

A heating apparatus for a vehicle includes an air heating unit configured to heat air conditioning air to be sent into a vehicle cabin, a contact heating unit configured to heat a member that is in contact with a body of an occupant in the vehicle cabin, and an electronic control unit. A heat source of the air heating unit and a heat source of the contact heating unit each are supplied with an electric power from one or more batteries. The electronic control unit is configured to decrease an electric power that is supplied to the heat source of the air heating unit when the heat source of the contact heating unit is on as compared to an electric power that is supplied to the heat source of the air heating unit when the heat source of the contact heating unit is off.

15 Claims, 9 Drawing Sheets

(52) U.S. Cl.
CPC ..... *B60H 1/00428* (2013.01); *B60H 1/00807* (2013.01); *B60H 1/00878* (2013.01); *B60H 1/2221* (2013.01); *B60H 1/2225* (2013.01); *B60H 2001/224* (2013.01)

(58) Field of Classification Search
CPC .......... B60H 1/00295; B60H 2001/225; B60H 2001/224; B60H 1/00428; B60H 1/00807; B60H 1/00878; B60H 1/2221; B60H 1/2225; B60H 1/224; B60H 1/034
See application file for complete search history.

(56) References Cited

U.S. PATENT DOCUMENTS

| | | | | |
|---|---|---|---|---|
| 2006/0042788 | A1* | 3/2006 | Naruse | B60H 1/00985 |
| | | | | 62/239 |
| 2008/0168766 | A1* | 7/2008 | Oomura | B60H 1/025 |
| | | | | 60/320 |
| 2010/0187211 | A1* | 7/2010 | Eisenhour | B60H 1/2226 |
| | | | | 219/202 |
| 2011/0127246 | A1* | 6/2011 | Heiden | B60L 1/02 |
| | | | | 219/202 |
| 2012/0061365 | A1* | 3/2012 | Okamoto | B60H 1/2226 |
| | | | | 219/202 |
| 2012/0234932 | A1* | 9/2012 | Okamoto | B60H 1/0073 |
| | | | | 237/2 R |
| 2012/0312520 | A1* | 12/2012 | Hoke | B60N 2/002 |
| | | | | 219/217 |
| 2013/0020398 | A1* | 1/2013 | Goto | B60L 1/02 |
| | | | | 165/41 |
| 2013/0059522 | A1* | 3/2013 | Ota | B60H 1/00842 |
| | | | | 165/204 |
| 2013/0232996 | A1* | 9/2013 | Goenka | B60H 1/00742 |
| | | | | 62/3.61 |
| 2013/0274968 | A1 | 10/2013 | Federico et al. | |
| 2014/0110489 | A1* | 4/2014 | Yasui | B60N 2/5685 |
| | | | | 237/5 |
| 2015/0028116 | A1* | 1/2015 | Satzger | B60H 1/2227 |
| | | | | 165/41 |
| 2015/0360538 | A1* | 12/2015 | Hoke | B60N 2/002 |
| | | | | 219/217 |
| 2016/0031348 | A1* | 2/2016 | Kurosawa | B60N 2/5621 |
| | | | | 297/180.1 |
| 2016/0214456 | A1* | 7/2016 | Maranville | B60H 1/00392 |
| 2018/0105017 | A1* | 4/2018 | Seki | B60H 1/2215 |
| 2018/0201095 | A1* | 7/2018 | Sakane | B60H 1/00985 |
| 2018/0208021 | A1* | 7/2018 | Seki | B60H 1/2227 |
| 2018/0297449 | A1* | 10/2018 | Oide | B60H 1/2215 |
| 2019/0054825 | A1* | 2/2019 | Schwartz | B60H 1/034 |
| 2019/0077225 | A1* | 3/2019 | Nakamura | B60H 1/2221 |
| 2019/0111813 | A1 | 4/2019 | Hoshi et al. | |
| 2019/0126722 | A1* | 5/2019 | Ishikawa | F02D 29/02 |
| 2019/0126723 | A1* | 5/2019 | Ishikawa | B60H 1/2226 |
| 2019/0248211 | A1* | 8/2019 | Seki | H05B 3/342 |
| 2020/0130461 | A1* | 4/2020 | Seo | B60N 2/5678 |
| 2020/0269655 | A1* | 8/2020 | Yen | B60H 1/2218 |
| 2020/0391572 | A1* | 12/2020 | Tsukagishi | B60H 1/00428 |
| 2021/0094388 | A1* | 4/2021 | Kakade | B60H 1/2226 |
| 2021/0107335 | A1* | 4/2021 | Yokota | B60H 1/2227 |
| 2021/0206230 | A1* | 7/2021 | Ishikawa | B60H 1/2227 |
| 2022/0001720 | A1* | 1/2022 | Seki | B60H 1/00792 |
| 2022/0032724 | A1* | 2/2022 | Rotenburg | B60H 1/00499 |

FOREIGN PATENT DOCUMENTS

| | | | | |
|---|---|---|---|---|
| DE | 102008061773 A1 | * | 6/2010 | ........ B60H 1/00285 |
| DE | 102017204273 A1 | | 9/2018 | |
| DE | 102020101965 A1 | * | 8/2020 | .......... B60H 1/2218 |
| DE | 102020113638 A1 | * | 12/2020 | ........ B60H 1/00285 |
| JP | 06-234318 A | | 8/1994 | |
| JP | 2007283932 A | * | 11/2007 | ........ B60H 1/00742 |
| JP | 2010-143468 A | | 7/2010 | |
| JP | 2011-073657 A | | 4/2011 | |
| JP | 2011-073658 A | | 4/2011 | |
| JP | 2012-148689 A | | 8/2012 | |
| JP | 2012-157651 A | | 8/2012 | |
| JP | 2012-158226 A | | 8/2012 | |
| JP | 2013-180650 A | | 9/2013 | |
| JP | 2015229440 A | * | 12/2015 | |
| JP | 2016147546 A | * | 8/2016 | ............... B60H 1/22 |
| JP | 2017-178129 A | | 10/2017 | |
| JP | 2018-052419 A | | 4/2018 | |
| JP | 2019156162 A | * | 9/2019 | .......... B60H 1/2218 |
| JP | 2019177804 A | * | 10/2019 | ........ B60H 1/00207 |
| WO | WO-2015182126 A1 | * | 12/2015 | ........ B60H 1/00285 |
| WO | WO-2016070047 A1 | * | 5/2016 | ........ B60H 1/00271 |
| WO | WO-2016092792 A1 | * | 6/2016 | ........ B60H 1/00292 |
| WO | WO-2019187713 A1 | * | 10/2019 | ........ B60H 1/00207 |
| WO | WO-2019189499 A1 | * | 10/2019 | ........ B60H 1/00742 |

* cited by examiner ness, the electric power consumption of the batteries is reduced. When the electric power that is supplied to the heat source of the air heating unit is decreased in this way, the temperature of air conditioning air to be sent into the vehicle cabin decreases and, as a result, a vehicle cabin temperature also decreases; however, heat can be input to the occupant because the heat source of the contact heating unit is on, so the comfortable warm feeling of the occupant can be maintained.

HEATING APPARATUS FOR VEHICLE, METHOD OF CONTROLLING HEATING APPARATUS FOR VEHICLE, AND STORAGE MEDIUM

CROSS-REFERENCE TO RELATED APPLICATIONS

This application claims priority to Japanese Patent Application No. 2019-110222 filed on Jun. 13, 2019, which is incorporated herein by reference in its entirety including the specification, drawings and abstract.

BACKGROUND

1. Technical Field

The disclosure relates to a heating apparatus for a vehicle, a method of controlling heating apparatus for vehicle, and a storage medium.

2. Description of Related Art

It is known that air conditioners are used as heating apparatuses for vehicles and each air conditioner includes an air heating unit that heats air conditioning air to be sent into a vehicle cabin. It is also known that some vehicles include a unit (hereinafter, also referred to as contact heating unit) for heating a member that is in contact with a body of an occupant (occupant body contact member), such as a seat and a steering wheel, as a heating apparatus for a vehicle. Japanese Unexamined Patent Application Publication No. 2017-178129 (JP 2017-178129 A) describes a seat heating unit (referred to as seat heater in JP 2017-178129 A).

SUMMARY

Some air heating units heat air conditioning air by supplying electric power from a battery mounted on a vehicle to a heat source. Similarly, contact heating units heat an occupant body contact member by supplying electric power from a battery mounted on a vehicle to a heat source. For such heating apparatuses each including an air heating unit and a contact heating unit that use electric power from a battery, it is desired to reduce the electric power consumption of the battery while ensuring a comfortable warm feeling of an occupant.

The disclosure provides a heating apparatus for a vehicle, which includes a heat source of an air heating unit and a heat source of a contact heating unit each are supplied with electric power from a battery.

A first aspect of the disclosure provides a heating apparatus for a vehicle. The heating apparatus includes an air heating unit configured to heat air conditioning air to be sent into a vehicle cabin, a contact heating unit configured to heat a member that is in contact with a body of an occupant in the vehicle cabin, and an electronic control unit. A heat source of the air heating unit and a heat source of the contact heating unit each are supplied with an electric power from one or more batteries. The electronic control unit is configured to decrease an electric power that is supplied to the heat source of the air heating unit when the heat source of the contact heating unit is on as compared to an electric power that is supplied to the heat source of the air heating unit when the heat source of the contact heating unit is off.

With the first aspect of the disclosure, the electric power that is supplied to the heat source of the air heating unit when the heat source of the contact heating unit is on is decreased as compared to the electric power that is supplied to the heat source of the air heating unit when the heat source of the contact heating unit is off. Therefore, in comparison with the case where the electric power that is supplied to the heat source of the air heating unit is not adjusted based on whether the heat source of the contact heating unit is on or off, the electric power consumption of the batteries is reduced. When the electric power that is supplied to the heat source of the air heating unit is decreased in this way, the temperature of air conditioning air to be sent into the vehicle cabin decreases and, as a result, a vehicle cabin temperature also decreases; however, heat can be input to the occupant because the heat source of the contact heating unit is on, so the comfortable warm feeling of the occupant can be maintained.

In the first aspect, the electronic control unit may be configured to decrease the electric power that is supplied to the heat source of the air heating unit as the electric power that is supplied to the heat source of the contact heating unit increases.

With this configuration, when the electric power that is supplied to the heat source of the contact heating unit is high, the electric power that is supplied to the heat source of the air heating unit is decreased. Therefore, in comparison with the case where the electric power that is supplied to the heat source of the air heating unit is not adjusted according to the electric power that is supplied to the heat source of the contact heating unit, the electric power consumption of the batteries is reduced. With this configuration, as the electric power that is supplied to the heat source of the contact heating unit increases, the electric power that is supplied to the heat source of the air heating unit decreases, with the result that the temperature of air conditioning air to be sent into the vehicle cabin decreases and the vehicle cabin temperature also decreases; however, the electric power that is supplied to the heat source of the contact heating unit is increased, so a larger amount of heat is input to the occupant, so the comfortable warm feeling of the occupant is maintained.

In the above aspect, the electronic control unit may be configured to decrease a total electric power of the electric power that is supplied to the heat source of the contact heating unit and the electric power that is supplied to the heat source of the air heating unit when the heat source of the contact heating unit is on as compared to the electric power that is supplied to the heat source of the air heating unit when the heat source of the contact heating unit is off.

With this configuration, when the occupant actively turns on the heat source of the contact heating unit, the electric power consumption of the batteries is reduced.

In the above aspect, the electronic control unit may be configured to decrease the electric power that is supplied to the heat source of the air heating unit as an outside air temperature outside the vehicle increases.

With the above configuration, when the outside air temperature outside the vehicle is high, the electric power that is supplied to the heat source of the air heating unit is decreased. Therefore, in comparison with the case where the electric power that is supplied to the heat source of the air heating unit is not adjusted based on the outside air temperature outside the vehicle, the electric power consumption of the batteries is reduced.

In the above aspect, the air heating unit may be a hot-water heating unit configured to heat the air conditioning air as a result of passage of the air conditioning air around a heater core that is supplied with hot water. The heat source of the hot-water heating unit may be a water heater configured to heat water and supply the hot water.

In the above aspect, the electronic control unit may be configured to adjust an electric power that is supplied to the water heater such that a water temperature of the hot water when the heat source of the contact heating unit is on is lower than a water temperature of the hot water when the heat source of the contact heating unit is off.

In the above aspect, the contact heating unit may be a seat heating unit configured to heat a seat that is in contact with the body of the occupant.

In the above aspect, the contact heating unit may be a steering wheel heating unit configured to heat a steering wheel that is in contact with a hand of the occupant.

In the above aspect, the contact heating unit may be a floor heating unit configured to heat a floor that is in contact with a foot of the occupant.

In the above aspect, the vehicle may be a motor vehicle that is driven by using an electric power supplied from the one or more batteries.

A second aspect of the disclosure provides a method of controlling a heating apparatus for a vehicle. The method includes determining whether a heat source of an air heating unit configured to heat air conditioning air to be sent into a vehicle cabin is on or off, determining whether a heat source of a contact heating unit configured to heat a member that is in contact with a body of an occupant in the vehicle cabin is on or off, and decreasing an electric power that is supplied to the heat source of the air heating unit when the heat source of the contact heating unit is on as compared to an electric power that is supplied to the heat source of the air heating unit when the heat source of the contact heating unit is off.

In the above aspect, the method may further include decreasing the electric power that is supplied to the heat source of the air heating unit as the electric power that is supplied to the heat source of the contact heating unit increases.

In the above aspect, the method may further include decreasing a total electric power of the electric power that is supplied to the heat source of the contact heating unit and the electric power that is supplied to the heat source of the air heating unit when the heat source of the contact heating unit is on as compared to the electric power that is supplied to the heat source of the air heating unit when the heat source of the contact heating unit is off.

In the above aspect, the method may further include decreasing the electric power that is supplied to the heat source of the air heating unit as an outside air temperature outside the vehicle increases.

In the above aspect, the air heating unit may be a hot-water heating unit configured to heat the air conditioning air as a result of passage of the air conditioning air around a heater core that is supplied with hot water. The heat source of the hot-water heating unit may be a water heater configured to heat water and supply the hot water. The method may further include adjusting an electric power that is supplied to the water heater such that a water temperature of the hot water when the heat source of the contact heating unit is on is lower than a water temperature of the hot water when the heat source of the contact heating unit is off.

A third aspect of the disclosure provides a non-transitory storage medium storing instructions that are executable by one or more processors and that cause the one or more processors to perform functions. The functions include determining whether a heat source of an air heating unit configured to heat air conditioning air to be sent into a vehicle cabin is on or off, determining whether a heat source of a contact heating unit configured to heat a member that is in contact with a body of an occupant in the vehicle cabin is on or off, and decreasing an electric power that is supplied to the heat source of the air heating unit when the heat source of the contact heating unit is on as compared to an electric power that is supplied to the heat source of the air heating unit when the heat source of the contact heating unit is off.

According to the disclosure, the electric power consumption of the batteries is reduced while the comfortable warm feeling of an occupant in a vehicle is ensured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described with reference to the accompanying drawings. The configurations that will be described below are illustrative for the purpose of description and may be modified as needed in conformity with, for example, the specifications of a vehicle, air conditioner, and contact heating unit. Like reference signs denote similar elements in all the drawings, and the description thereof will not be repeated.

Figure 1:
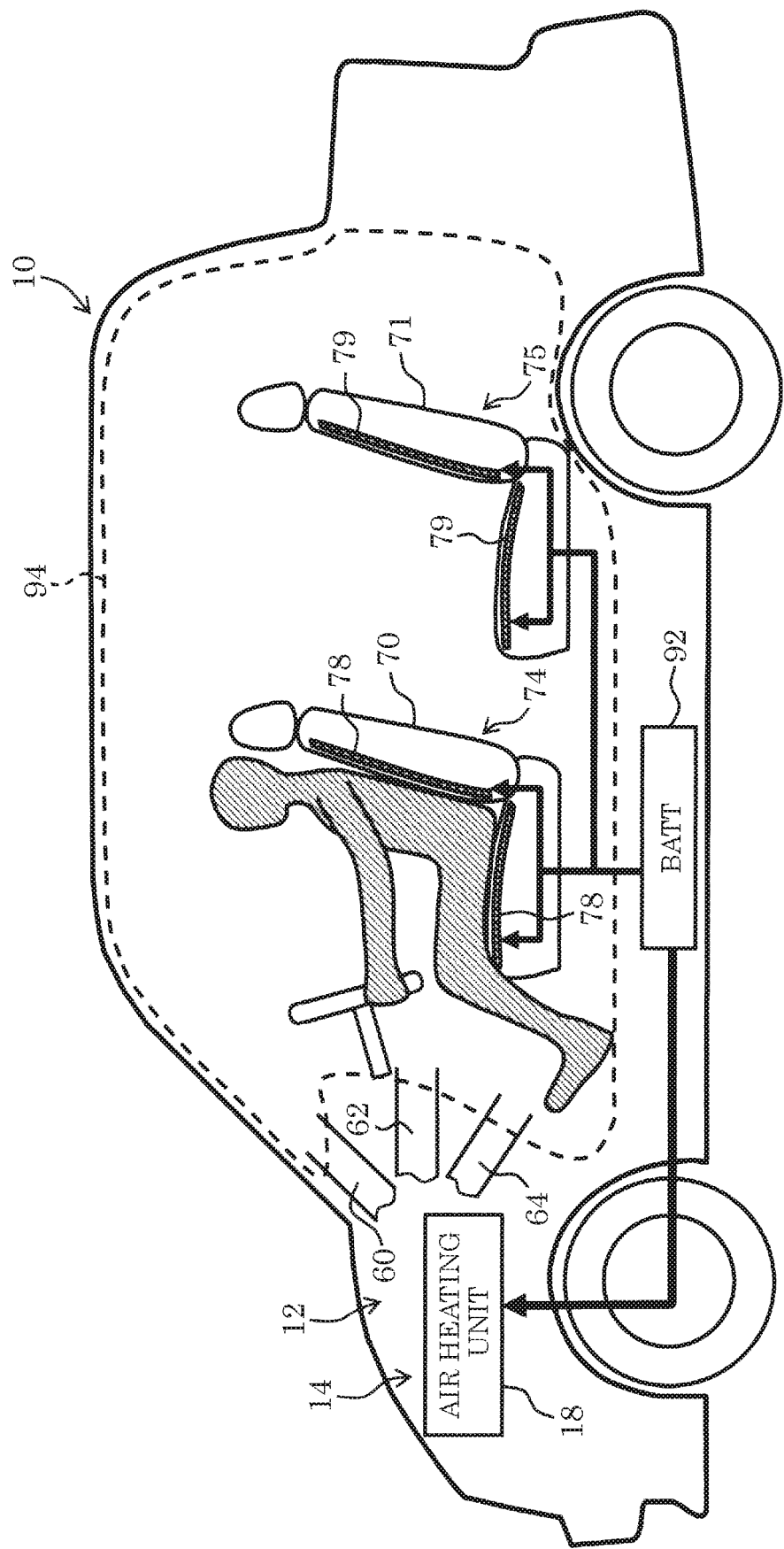
FIG. 1 is a diagram that schematically shows a vehicle equipped with a heating apparatus.

FIG. 1 is a diagram that schematically shows a vehicle 10 equipped with a heating apparatus 12. The vehicle 10 includes three or more seats; however, two seats 70, 71 of the three or more seats are drawn in FIG. 1. The vehicle 10 is an electric vehicle that is driven by using an electric power supplied from a battery 92 to a motor (not shown).

The heating apparatus 12 includes an air conditioner 14 and seat heating units 74, 75. The air conditioner 14 sends air conditioning air into a vehicle cabin 94. The seat heating units 74, 75 respectively heat seats 70, 71 on which occupants are seated. The air conditioner 14 is disposed at the front side of the vehicle 10, and includes an air heating unit 18 that heats air conditioning air. The seat heating unit is provided seat by seat. A heat source of the air heating unit 18 and a heat source of each of the seat heating units 74, 75 generate heat by using an electric power supplied from the battery 92. The seat heating units 74, 75 each are an example of a contact heating unit.

Figure 2:
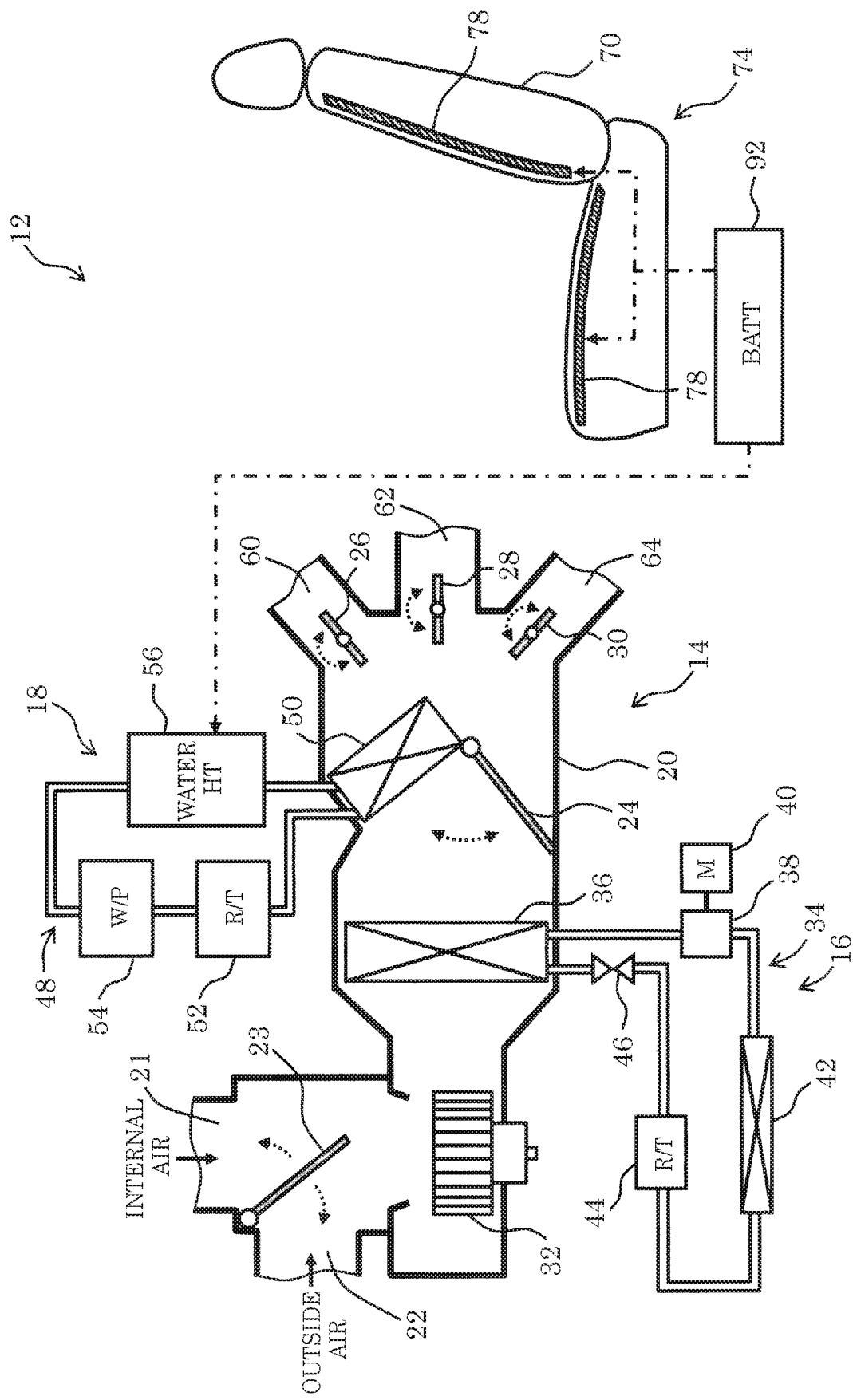
FIG. 2 is a diagram that schematically shows the configuration of the heating apparatus.
Figure 3:
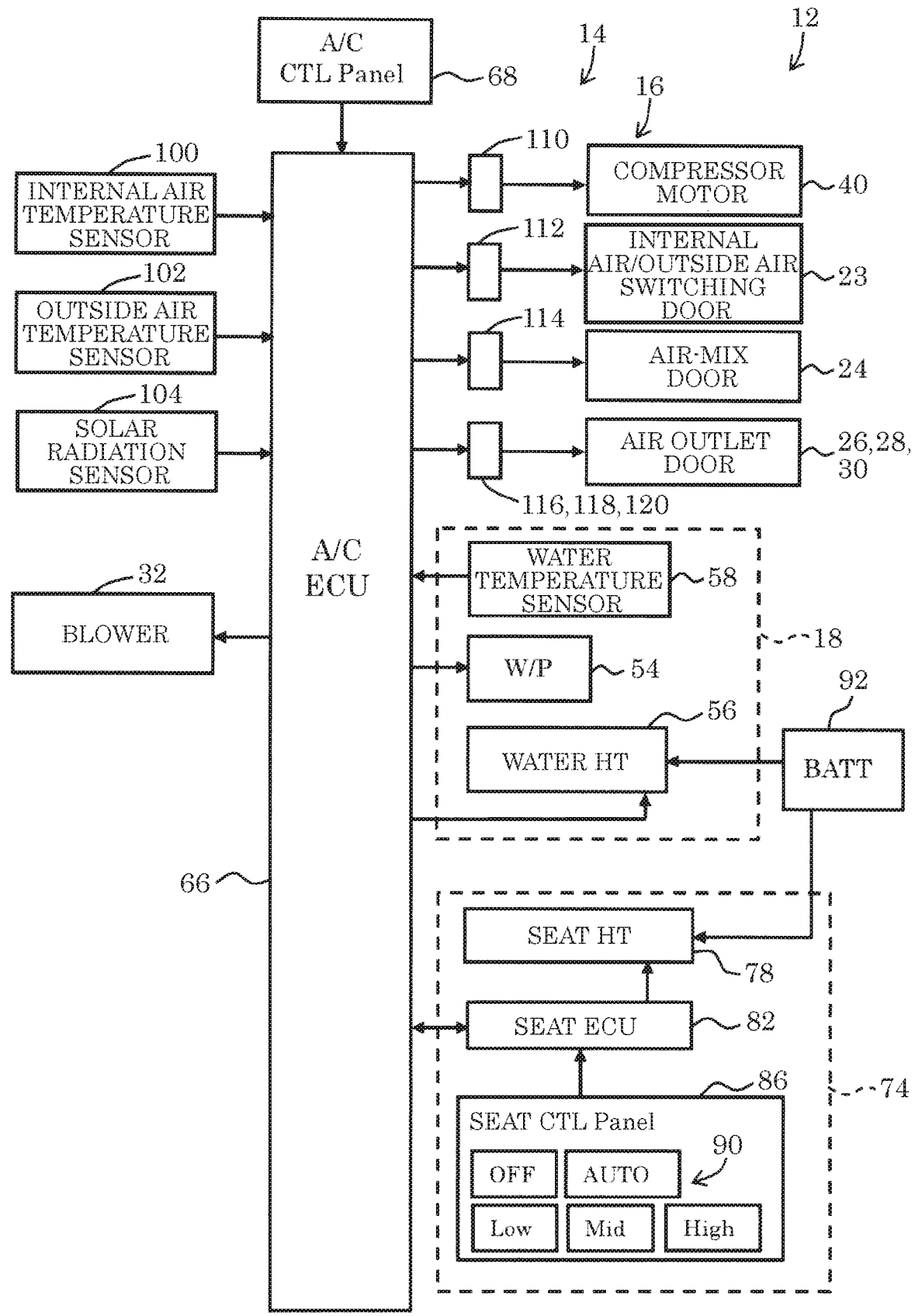
FIG. 3 is a block diagram that shows the electrical configuration of the heating apparatus.

FIG. 2 is a diagram that schematically shows the configuration of the heating apparatus 12. FIG. 3 is a block diagram that shows the electrical configuration of the heating apparatus 12. In FIG. 2, of the plurality of seats, only the driver seat 70 is drawn. Similarly, in FIG. 3, of the seat heating units 74, 75, only the seat heating unit 74 of the driver seat 70 is drawn.

As shown in FIG. 2, the air conditioner 14 includes an air-conditioning case 20, a cooling and dehumidifying unit 16, and the air heating unit 18. The air-conditioning case 20 defines an air duct for air to be sent. The cooling and dehumidifying unit 16 cools or dehumidifies air to be sent. The air heating unit 18 heats air to be sent.

The air-conditioning case 20 has an internal air inlet 21 and an outside air inlet 22 at one side and has a plurality of air outlets 60, 62, 64 at the other side. Air directed toward the vehicle cabin passes through the air outlets 60, 62, 64. The internal air inlet 21 is an air inlet for taking air in the vehicle cabin into the air-conditioning case 20. The outside air inlet 22 is an air inlet for taking air outside the vehicle 10 into the air-conditioning case 20. An internal air/outside air switching door 23 is provided near the internal air inlet 21 and the outside air inlet 22. The internal air/outside air switching door 23 is actuated by an actuator, such as a servomotor, and changes the opening degree of each of the internal air inlet 21 and the outside air inlet 22. A blower 32 is provided on an air downstream side of the internal air/outside air switching door 23. The blower 32 is a centrifugal blower that generates air stream directed toward the vehicle cabin inside the air-conditioning case 20. The blower 32 has a function of changing the volume of air conditioning air that is blown out from the air outlets 60, 62, 64 toward the vehicle cabin.

An evaporator 36 that is part of the cooling and dehumidifying unit 16 and a heater core 50 that is part of the air heating unit 18 are provided on the air downstream side of the blower 32. The evaporator 36 has a function of cooling and dehumidifying air passing through the inside of the air-conditioning case 20. The heater core 50 has a function of heating air passing through the inside of the air-conditioning case 20. The heater core 50 is provided on the air downstream side of the evaporator 36.

An air-mix door 24 is provided inside the air-conditioning case 20. The air-mix door 24 changes the ratio between air caused to pass through the heater core 50 and air caused to bypass the heater core 50, of air passing through the evaporator 36. The air-mix door 24 is actuated by an actuator, such as a servomotor.

The air outlets 60, 62, 64 of the air-conditioning case 20 are respectively provided with air outlet doors 26, 28, 30. Each of the air outlet doors 26, 28, 30 is actuated by an actuator, such as a servomotor, and has a function of changing the volume of air conditioning air that is blown out from an associated one of the air outlets 60, 62, 64.

Next, the cooling and dehumidifying unit 16 will be described. The cooling and dehumidifying unit 16 cools and dehumidifies air as a result of passage of air around the evaporator 36. The cooling and dehumidifying unit 16 has a refrigerant circuit 34 in which refrigerant circulates. The refrigerant circuit 34 includes a compressor 38, a condenser 42, a receiver tank 44, an expansion valve 46, and the evaporator 36. The compressor 38 compresses and discharges refrigerant flowing in from the evaporator 36. The condenser 42 condenses and liquefies refrigerant discharged from the compressor 38. The receiver tank 44 separates liquid refrigerant flowing in from the condenser 42 into gas and liquid. The expansion valve 46 adiabatically expands liquid refrigerant flowing in from the receiver tank 44. The evaporator 36 evaporates refrigerant in a gas-liquid two-phase state, flowing in from the expansion valve 46. Rotational power is transmitted from a motor 40 to the evaporator 36. The air cooling capacity of the evaporator 36 is variable by changing the rotation speed of the motor 40.

Next, the air heating unit 18 will be described. The air heating unit 18 heats air as a result of passage of air around the heater core 50. The air heating unit 18 has a hot water circuit 48 in which hot water circulates. The hot water circuit 48 includes an electric water pump 54, a water heater 56, the heater core 50, and a reserve tank 52. The electric water pump 54 is used to circulate water (hot water) in the hot water circuit 48. The water heater 56 heats water by using an electric power supplied from the battery 92. The heater core 50 exchanges heat between air to be sent and hot water produced by the water heater 56. The reserve tank 52 temporarily stores hot water. The air heating capacity of the heater core 50 is variable by changing the electric power that is supplied to the water heater 56. The water heater 56 is an example of the heat source of the air heating unit 18.

Next, the electrical configuration of the air conditioner 14 will be described. As shown in FIG. 3, the air conditioner 14 includes an air conditioner ECU 66 (also referred to as electronic control unit) and an air conditioner control panel 68. Although not shown in the drawing, a microcomputer is provided inside the air conditioner ECU 66. The microcomputer has functions such as a central processing unit (CPU) that executes arithmetic processing or control processing, a memory such as a ROM and a RAM, and input/output circuits (I/O ports). The air conditioner control panel 68 includes, for example, a liquid crystal display and a plurality of switches. The air conditioner control panel 68 is operated by an occupant and receives the on or off state, set temperature, or the like, of the air conditioner 14. The air conditioner control panel 68 is connected to the air conditioner ECU 66. Operating information received from an occupant is input to the air conditioner ECU 66.

An internal air temperature sensor 100, an outside air temperature sensor 102, and a solar radiation sensor 104 are connected to the air conditioner ECU 66. The internal air temperature sensor 100 detects a vehicle cabin temperature. The outside air temperature sensor 102 detects a temperature (outside air temperature) outside the vehicle 10. The solar radiation sensor 104 detects the amount of solar radiation. Detected values of the sensors 100, 102, 104 are input to the air conditioner ECU 66. The blower 32 disposed inside the air-conditioning case 20, a motor driver circuit 110 for the motor 40 that drives the compressor 38 of the cooling and dehumidifying unit 16, the actuator 112 for the internal air/outside air switching door 23, the actuator 114 for the air-mix door 24, and the actuators 116, 118, 120 for the air outlet doors 26, 28, 30 are connected to the air conditioner ECU 66. The air conditioner ECU 66 controls these devices.

The air heating unit 18 includes a water temperature sensor 58 that detects the temperature of hot water circulating in the hot water circuit 48. The water temperature sensor 58 is connected to the air conditioner ECU 66. A detected value of the water temperature sensor 58 is input to the air conditioner ECU 66. The electric water pump 54 and water heater 56 of the air heating unit 18 are connected to the air conditioner ECU 66. The air conditioner ECU 66 controls these devices. As will be described in detail later, the air conditioner ECU 66 determines a target water temperature of the hot water circuit 48 of the air heating unit 18 and adjusts the amount of heat generated by the water heater 56 by adjusting the electric power that is supplied to the water heater 56 such that the deviation between the target water temperature and an actual temperature of hot water in the hot water circuit 48 (a detected value of the water temperature sensor 58) is eliminated.

Next, the seat heating unit 74 will be described. As shown in FIG. 2, the seat heating unit 74 includes a seat heater 78 disposed in the bottom and backrest of the seat 70. As shown in FIG. 3, the seat heating unit 74 includes a seat ECU 82 and a seat control panel 86. Although not shown in the drawing, a microcomputer is provided inside the seat ECU 82. The microcomputer has functions such as a central processing unit (CPU) that executes arithmetic processing or control processing, a memory such as a ROM and a RAM, and input/output circuits (I/O ports). The seat control panel 86 and the seat heater 78 are connected to the seat ECU 82. The seat ECU 82 changes the amount of heat generated by changing the electric power that is supplied to the seat heater 78 based on operating information that is input from the seat control panel 86. The seat ECU 82 is connected to the air conditioner ECU 66 and is able to exchange information with the air conditioner ECU 66. The seat heater 78 is an example of the heat source of the seat heating unit 74.

The seat control panel 86 includes "OFF", "AUTO", "Low", "Mid", and "High" switches 90 for an occupant to control the seat heater 78. When the "OFF" switch 90 of the seat control panel 86 is depressed, the seat ECU 82 causes the seat heater 78 to stop generating heat by stopping an electric power supplied to the seat heater 78 (turning off the seat heater 78). On the other hand, when the "AUTO", "Low", "Mid", or "High" switch 90 of the seat control panel 86 is depressed, the seat ECU 82 causes the seat heater 78 to generate heat by supplying an electric power to the seat heater 78 (turning on the seat heater 78). Specifically, when the "Low" switch 90 of the seat control panel 86 is depressed, the seat ECU 82 causes the seat heater 78 to generate heat at a low amount of heat generated by supplying the seat heater 78 with a small amount of electric power. When the "Mid" switch 90 is depressed, the seat ECU 82 causes the seat heater 78 to generate heat by supplying the seat heater 78 with an amount of electric power larger than that when the "Low" switch 90 is depressed. When the "High" switch 90 is depressed, the seat ECU 82 causes the seat heater 78 to generate heat at a high amount of heat generated by supplying the seat heater 78 with an amount of electric power larger than that when the "Mid" switch 90 is depressed.

When the "AUTO" switch 90 of the seat control panel 86 is depressed, the seat ECU 82 changes the amount of heat generated by changing the electric power that is supplied to the seat heater 78 according to a vehicle cabin temperature. At this time, the seat ECU 82, for example, acquires a detected value of the internal air temperature sensor 100 via the air conditioner ECU 66 as the vehicle cabin temperature. The seat ECU 82 applies the seat heater 78 with any one of three-level electric powers to be supplied to the seat heater 78 when the "Low", "Mid", or "High" switch 90 is depressed according to the vehicle cabin temperature. Specifically, the seat ECU 82 causes the seat heater 78 to operate at an electric power for the "Low" switch (hereinafter, the operational status of the seat heater 78 is "Low") when the vehicle cabin temperature is higher than a first threshold. The seat ECU 82 causes the seat heater 78 to operate at an electric power for the "Mid" switch (hereinafter, the operational status of the seat heater 78 is "Mid") when the vehicle cabin temperature is lower than or equal to the first threshold and higher than a second threshold. The seat ECU 82 causes the seat heater 78 to operate at an electric power for the "High" switch (hereinafter, the operational status of the seat heater 78 is "High") when the vehicle cabin temperature is lower than or equal to the second threshold.

Figure 4:
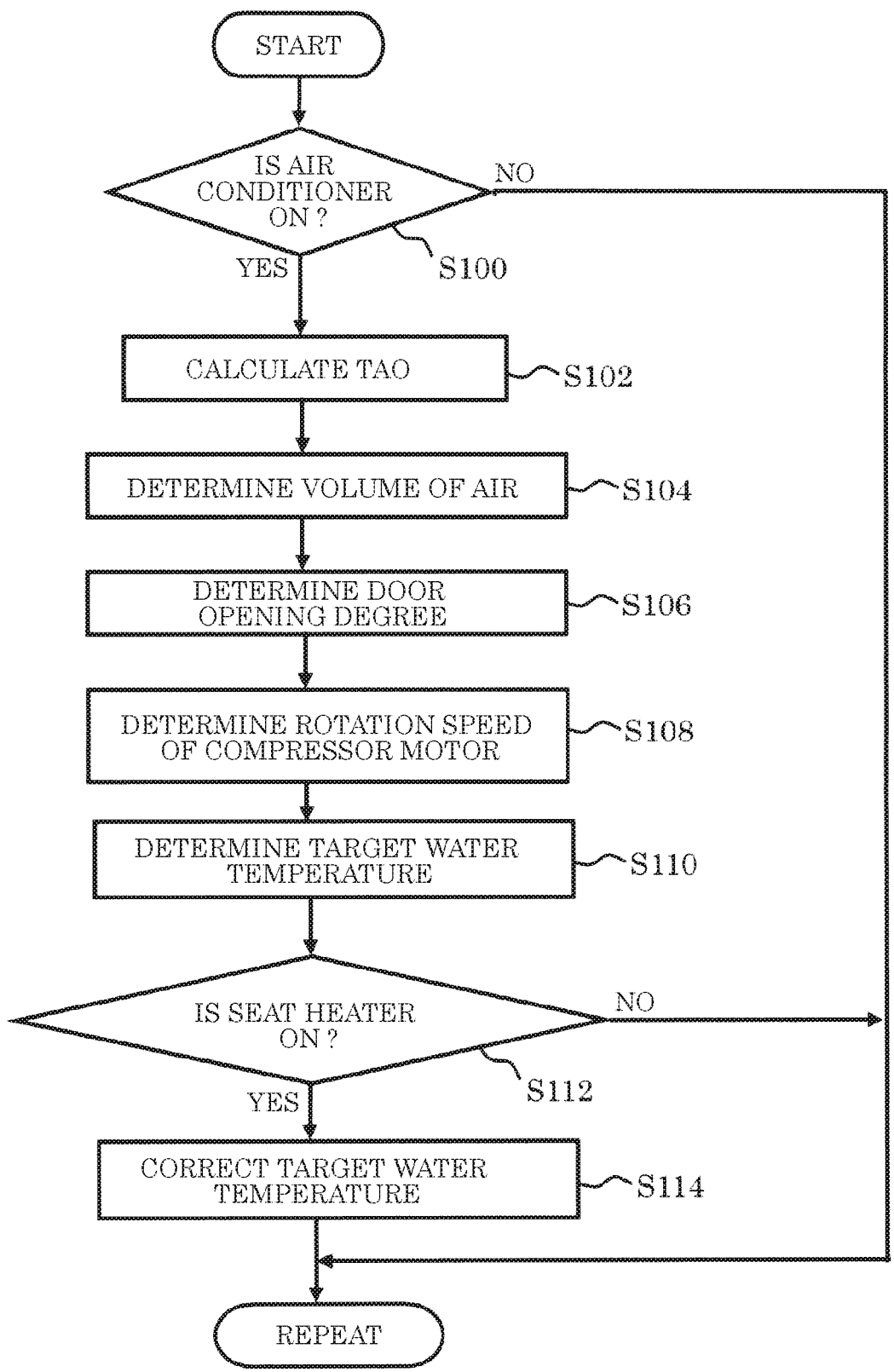
FIG. 4 is a flowchart that shows an example of the flow of a process of controlling an air conditioner.

Next, the process of controlling the air conditioner 14 will be described. FIG. 4 is a flowchart that shows an example of the flow of the process of controlling the air conditioner 14. The air conditioner ECU 66 (electronic control unit) executes the flow of FIG. 4 at a predetermined cycle. In the present embodiment, the water heater 56 of the air heating unit 18 of the air conditioner 14 is controlled in accordance with the on or off state of the seat heater 78 of the driver seat. Hereinafter, this will be described in detail with reference to the flow of FIG. 4.

First, in S100 of FIG. 4, the air conditioner ECU 66 checks whether the air conditioner 14 is on. When the air conditioner 14 is off (No in S100), the process of this cycle is ended. On the other hand, when the air conditioner 14 is on (Yes in S100), the process proceeds to S102.

In S102, the air conditioner ECU 66 calculates a target air outlet temperature (also referred to as TAO) that is a target temperature of air conditioning air that is blown out from the air outlets 60, 62, 64 of the air-conditioning case 20. In calculating the TAO, first, the air conditioner ECU 66 acquires a set temperature Tset set by an occupant through the air conditioner control panel 68, a vehicle cabin temperature Tr that is a detected value of the internal air temperature sensor 100, an outside air temperature Tam that is a detected value of the outside air temperature sensor 102, and an amount of solar radiation Ts that is a detected value of the solar radiation sensor 104. The air conditioner ECU 66, for example, calculates the TAO by using the following mathematical expression (1).

$$TAO = Kset \times Tset - Kr \times Tr - Kam \times Tam - Ks \times Ts + C \quad (1)$$

In the mathematical expression (1), Kset, Kr, Kam, and Ks are gains, and C is a correction constant related to the whole. Kset, Kr, Kam, Ks, and C are, for example, prestored in the memory of the air conditioner ECU 66.

Subsequently, in S104, the air conditioner ECU 66 determines the volume of air from the blower 32 based on the TAO and controls the blower 32 such that the determined volume of air is achieved. Then, in S106, the air conditioner ECU 66 determines the opening degree of each of the internal air/outside air switching door 23 and the air-mix door 24 based on the TAO and controls the actuator 112 of the internal air/outside air switching door 23 and the actuator 114 of the air-mix door 24 such that the determined opening degrees are achieved. For example, in winter, when the target air outlet temperature (TAO) is too high as compared to a vehicle cabin temperature, the opening degree of the air-mix door 24 is controlled such that almost all the air passing through the evaporator 36 passes through the heater core 50 as shown in FIG. 2.

Subsequently, in S108, the air conditioner ECU 66 determines the rotation speed of the motor 40 that drives the compressor 38 of the cooling and dehumidifying unit 16 for rotation based on the TAO and controls the motor driver circuit 110 of the motor 40 such that the determined rotation speed is achieved.

Subsequently, in S110, the air conditioner ECU 66 determines a target water temperature Tgw of hot water in the air heating unit 18 based on the TAO. For example, a map that associates TAO and Tgw is prestored in the memory of the air conditioner ECU 66, and the air conditioner ECU 66 determines Tgw from TAO by consulting the map. Alternatively, the air conditioner ECU 66 calculates Tgw by performing predetermined computation using TAO. Here, Tgw is determined to be a higher value as TAO increases.

Subsequently, in S112, the air conditioner ECU 66 acquires information about the on or off state of the seat heater 78 of the driver seat from the seat ECU 82 of the seat heating unit 74 of the driver seat. When the seat heater 78 is off (No in S112), the air conditioner ECU 66 controls the amount of heat generated by controlling the electric power that is supplied to the water heater 56 such that the deviation between the target water temperature Tgw determined in S110 and an actual temperature Taw of hot water (a detected value of the water temperature sensor 58) in the hot water circuit 48 of the air heating unit 18 is eliminated. Then, the process of this cycle is ended.

On the other hand, when the seat heater 78 of the driver seat is on (Yes in S112), the process proceeds to S114. In S114, the air conditioner ECU 66 corrects the target water temperature Tgw determined in S110 such that the target water temperature Tgw is decreased. The air conditioner ECU 66, for example, corrects Tgw by using the following mathematical expression (2).

$$Tgw = Kgw \times Tgw \quad (2)$$

In the mathematical expression (2), Kgw is a correction coefficient less than 1.0 and is, for example, prestored in the memory of the air conditioner ECU 66. The air conditioner ECU 66 controls the amount of heat generated by controlling the electric power that is supplied to the water heater 56 such that the deviation between the target water temperature Tgw corrected in S114 and an actual temperature Taw of hot water (a detected value of the hot water sensor 58) in the hot water circuit 48 of the air heating unit 18 is eliminated. Here, since the target water temperature Tgw in the case where the seat heater 78 is on (Yes in S112) is corrected to be lower than the target water temperature Tgw in the case where the seat heater 78 is off (No in S112), the air conditioner ECU 66 decreases the electric power that is supplied to the water heater 56 when the seat heater 78 is on as compared to the electric power that is supplied to the water heater 56 when the seat heater 78 is off. The air conditioner ECU 66 repeatedly executes the above-described process of the flow of FIG. 4 at a predetermined cycle.

Next, the operation and advantageous effects of the above-described heating apparatus 12 of present embodiment will be described.

With the above-described heating apparatus 12 of the present embodiment, the electric power that is supplied to the water heater 56 (heat source) of the air heating unit 18 when the seat heater 78 (heat source) of the seat heating unit 74 (contact heating unit) of the driver seat is on is decreased as compared to the electric power that is supplied to the water heater 56 (heat source) of the air heating unit 18 when the seat heater 78 is off. Therefore, in comparison with the case where the electric power that is supplied to the water heater 56 of the air heating unit 18 is not adjusted based on whether the seat heater 78 is on or off, the electric power consumption of the battery 92 is reduced. Since the vehicle 10 (electric vehicle) of the present embodiment is driven by using the battery 92, the range of the vehicle 10 can be extended by the amount by which the electric power consumption of the battery 92 is reduced. In other words, the available range of the vehicle 10 for one battery charging can be extended (fuel economy performance can be improved).

Figure 5:
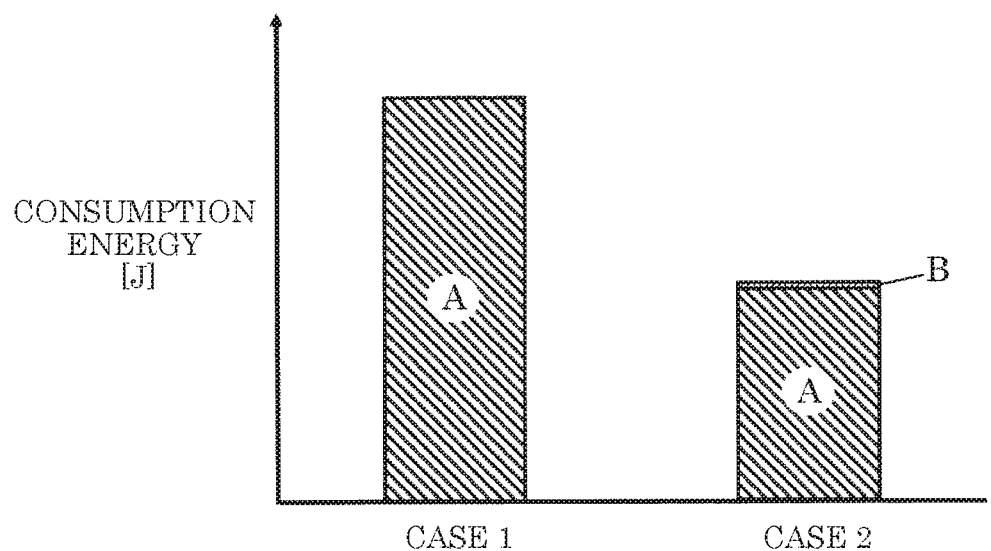
FIG. 5 is a graph that shows an example of the consumption energy of the heating apparatus when a seat heater is off (case 1) or when the seat heater is on (case 2)

FIG. 5 is a graph that shows an example of the consumption energy (case 1) of the water heater 56 when the air conditioner 14 is operated for a set period of time while the seat heater 78 is off or the consumption energy (case 2) of the water heater 56 and seat heater 78 when the air conditioner 14 is operated for the same period of time as case 1 while the seat heater 78 is on in the present embodiment. In FIG. 5, the graph A represents the consumption energy of the water heater 56, and the graph B represents the consumption energy of the seat heater 78. As shown in FIG. 5, since the water heater 56 warms the wide vehicle cabin 94 (see FIG. 1), the consumption energy (amount of heat) is by far greater than the consumption energy (amount of heat) of the seat heater 78 that is disposed in close contact with an occupant. As is apparent from case 2 of FIG. 5, employing the heating apparatus 12 of the present embodiment and decreasing the consumption energy by decreasing the electric power that is supplied to the water heater 56 when the seat heater 78 is on significantly contributes to electric energy savings of the battery 92.

On the other hand, when the electric power that is supplied to the water heater 56 is decreased in this way, the temperature of air conditioning air to be sent into the vehicle cabin decreases and the vehicle cabin temperature also decreases; however, heat can be input to the occupant since the seat heater 78 is on, so the comfortable warm feeling of the occupant is maintained. In this way, with the heating apparatus 12 of the present embodiment, the electric power consumption of the battery 92 can be reduced while the comfortable warm feeling of the occupant is ensured.

In the heating apparatus 12 of the present embodiment, the air conditioner ECU 66 desirably corrects (S114 of FIG. 4) the target water temperature such that a total electric power of the electric power that is supplied to the seat heater 78 and the electric power that is supplied to the water heater 56 when the seat heater 78 is on is lower than the electric power that is supplied to the water heater 56 when the seat heater 78 is off. With this configuration, when the occupant actively turns on the seat heater 78, the electric power consumption of the battery 92 is reduced.

With the heating apparatus 12 of the present embodiment, the air conditioner ECU 66 decreases the target air outlet temperature (TAO) as the outside air temperature Tam outside the vehicle 10 increases (see the mathematical expression (1)) and decreases the target water temperature Tgw of the air heating unit 18 as the TAO decreases (S110 of FIG. 4). In other words, the air conditioner ECU 66 decreases the electric power that is supplied to the water heater 56 of the air heating unit 18 as the outside air temperature Tam outside the vehicle 10 increases. Therefore, in comparison with the case where the electric power that is supplied to the water heater 56 is not adjusted based on the outside air temperature outside the vehicle 10, the electric power consumption of the battery 92 is reduced.

Figure 6:
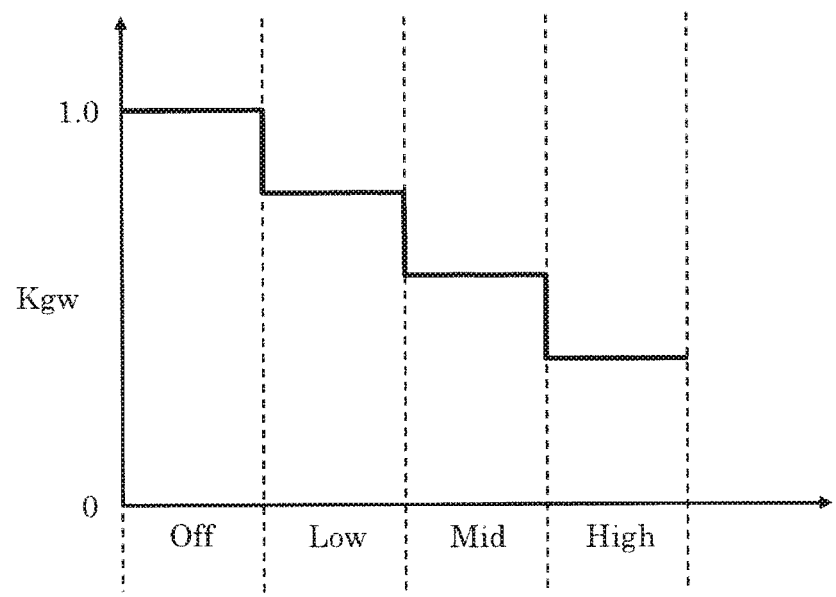
FIG. 6 is a graph that shows an example of a correction coefficient commensurate with the operational status of the seat heater.

Next, a modification will be described. In the heating apparatus 12 of the above-described embodiment, when the seat heater 78 is on, the air conditioner ECU 66 uniformly corrects the target water temperature Tgw (S114 of FIG. 4) regardless of whether the electric power that is supplied to the seat heater 78 is high or low. However, the air conditioner ECU 66 may correct the target water temperature Tgw such that the target water temperature Tgw decreases as the electric power that is supplied to the seat heater 78 increases. For example, the correction coefficient Kgw of the above-described mathematical expression (2) is reduced as the operational status of the seat heater 78 changes in order of "Low", "Mid", and "High" as shown in FIG. 6. Since the target water temperature Tgw is decreased as the electric power that is supplied to the seat heater 78 increases, the electric power that is supplied to the water heater 56 decreases as the electric power that is supplied to the seat heater 78 increases. With this configuration, the electric power that is supplied to the water heater 56 is further decreased when the electric power that is supplied to the seat heater 78 is further higher. Therefore, in comparison with the case where the electric power that is supplied to the water heater 56 is not adjusted according to the electric power that is supplied to the seat heater 78, the electric power consumption of the battery 92 is effectively reduced. In the case of this configuration, as the electric power that is supplied to the seat heater 78 increases, the electric power that is supplied to the water heater 56 decreases, the temperature of air conditioning air to be sent into the vehicle cabin decreases, and the vehicle cabin temperature also decreases; however, since the electric power that is supplied to the seat heater 78 is increased, a large amount of heat can be input to the occupant, so the comfortable warm feeling of the occupant is maintained.

In the heating apparatus 12 of the above-described embodiment, the electric power that is supplied to the water heater 56 is changed according to the operational status of the seat heater 78 of the driver seat. However, the electric power that is supplied to the water heater 56 may be changed according to the operational status of a seat heater of the seat other than the driver seat. For example, the electric power that is supplied to the water heater 56 may be changed according to the operational status of a seat heater of a front passenger seat heater. Alternatively, for example, the electric power that is supplied to the water heater 56 may be changed according to the operational status of a seat heater 79 of a rear seat 71 (see FIG. 1). The seat heater 79 is an example of the heat source of the seat heating unit 74. As another embodiment, for example, only when seat heaters of seats equal to or greater than a predetermined number are on, the electric power that is supplied to the water heater 56 may be reduced by correcting the target water temperature of the air heating unit 18 such that the target water temperature decreases.

The air heating unit 18 of the above-described embodiment heats air as a result of passage of air around the heater core 50 to which hot water is supplied (referred to as hot water heating unit). However, the air heating unit 18 is not limited to a hot water heating unit. For example, the air heating unit 18 may heat air as a result of passage of air around an energized heat generating element that generates heat when supplied with an electric power from the battery 92 (referred to as element heating unit). In this case, the electric power Pe that is supplied to the energized heat generating element when the seat heater 78 is on is decreased as compared to the electric power Pe that is supplied to the energized heat generating element when the seat heater 78 is off. For example, the air conditioner ECU 66 makes a correction such that the electric power Pe found in advance to be supplied to the energized heat generating element is decreased. The air conditioner ECU 66, for example, corrects Pe by using the following mathematical expression (3).

$$Pe = Ke \times Pe \quad (3)$$

In the mathematical expression (3), Ke is a correction coefficient less than 1.0. Ke may be reduced as the operational status of the seat heater 78 changes in order of "Low", "Mid", and "High" as in the case of Kgw shown in FIG. 6.

The vehicle 10 equipped with the heating apparatus 12 of the above-described embodiment is an electric vehicle. However, the vehicle 10 is not limited to an electric vehicle. For example, the vehicle 10 may be a hybrid vehicle (including a plug-in hybrid vehicle) that is driven by an engine and a motor that is supplied with an electric power from the battery 92. An electric vehicle and a hybrid vehicle may be referred to as motor vehicles. Alternatively, the vehicle 10 may be an engine vehicle that is not driven by a motor and that is constantly driven by an engine. For example, in an engine vehicle or a hybrid vehicle, it is conceivable that, in addition to an air heating unit (main heating unit) using engine coolant, an air heating unit, such as the above-described hot water heating unit driven by using the battery 92, is provided as an auxiliary heating unit. In such a vehicle, when the electric power that is supplied to the auxiliary heating unit is changed according to the operational status of the seat heater, the electric power consumption of the battery 92 mounted on the vehicle is reduced. In addition, the amount of discharge of the battery 92 reduces, so the degradation of the battery 92 can be reduced.

Figure 7:
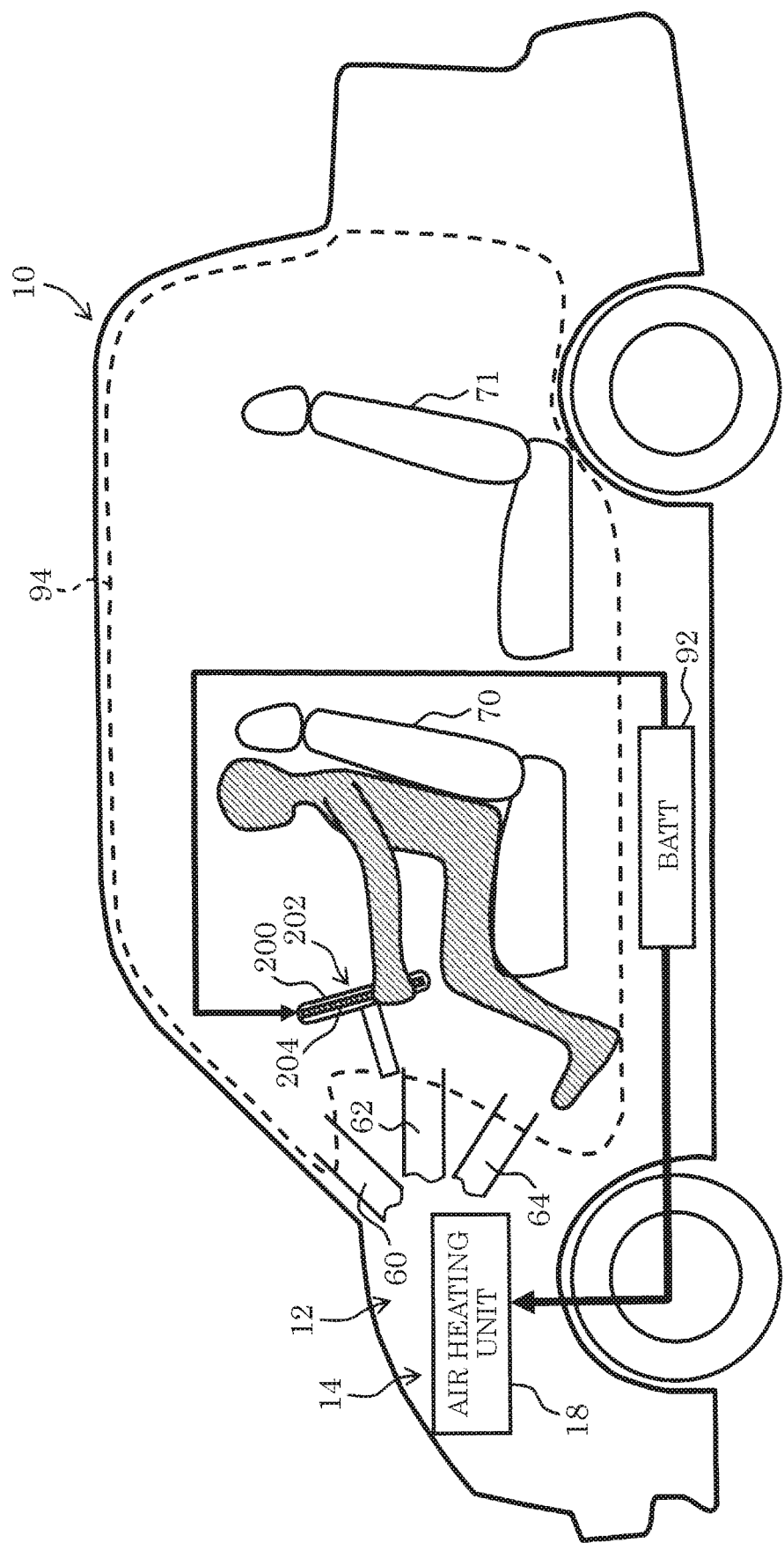
FIG. 7 is a diagram that schematically shows a vehicle equipped with a heating apparatus of another embodiment.
Figure 9:
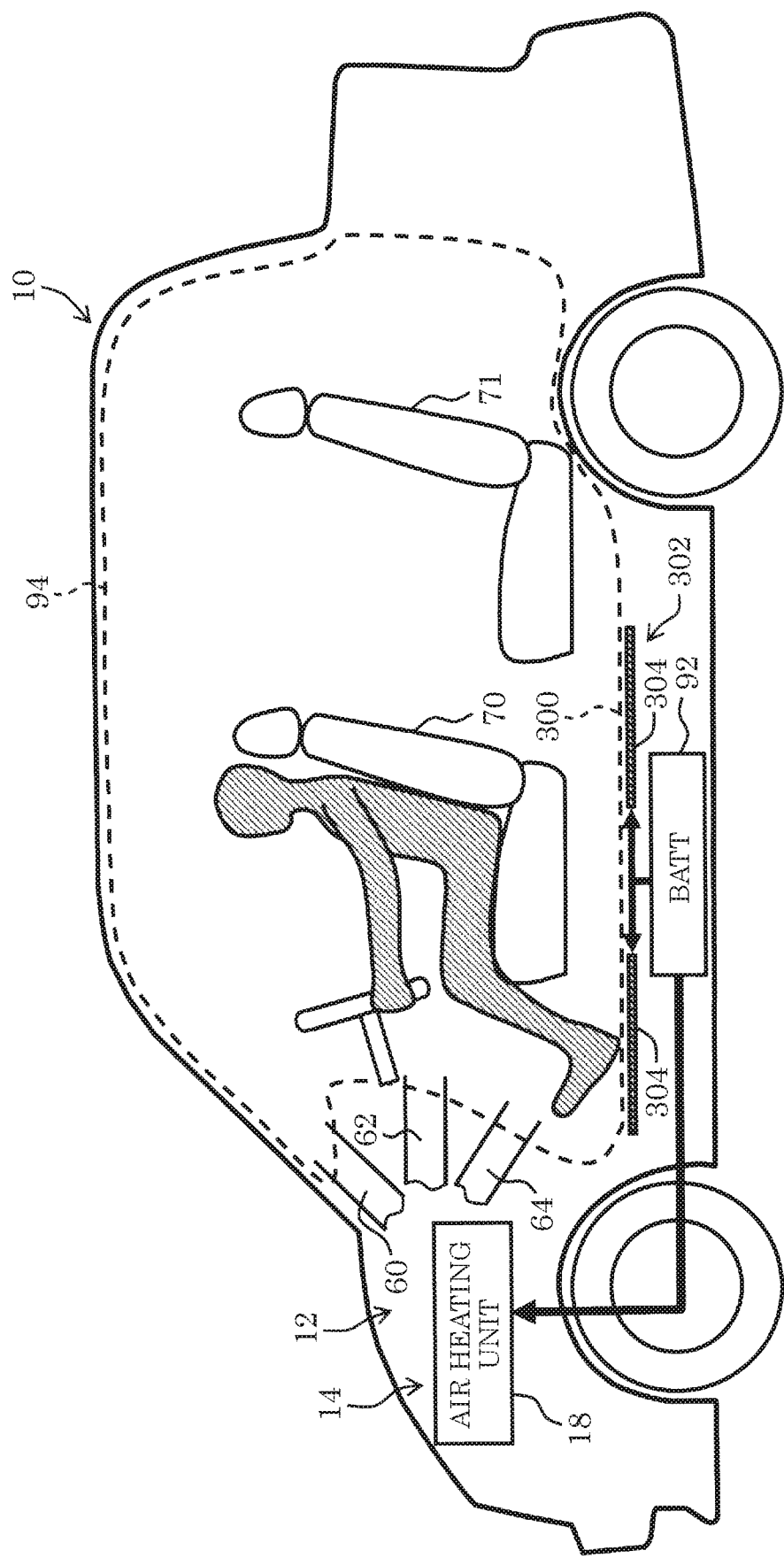
FIG. 9 is a diagram that schematically shows a vehicle equipped with a heating apparatus of yet another embodiment.

In the above-described embodiment, a unit that heats a member that is in contact with a body of an occupant (contact heating unit) is the seat heating unit 74. However, the contact heating unit is not limited to the seat heating unit 74. For example, the contact heating unit may be a steering wheel heating unit 202 as shown in FIG. 7. Alternatively, for example, the contact heating unit may be a floor heating unit 302 (also referred to as floor heating apparatus) as shown in FIG. 9. The "member that is in contact with a body of an occupant" in the specification means a member that is in direct contact with a skin of an occupant or a member that is in indirect contact with an occupant via clothes, shoes, or the like.

Figure 8:
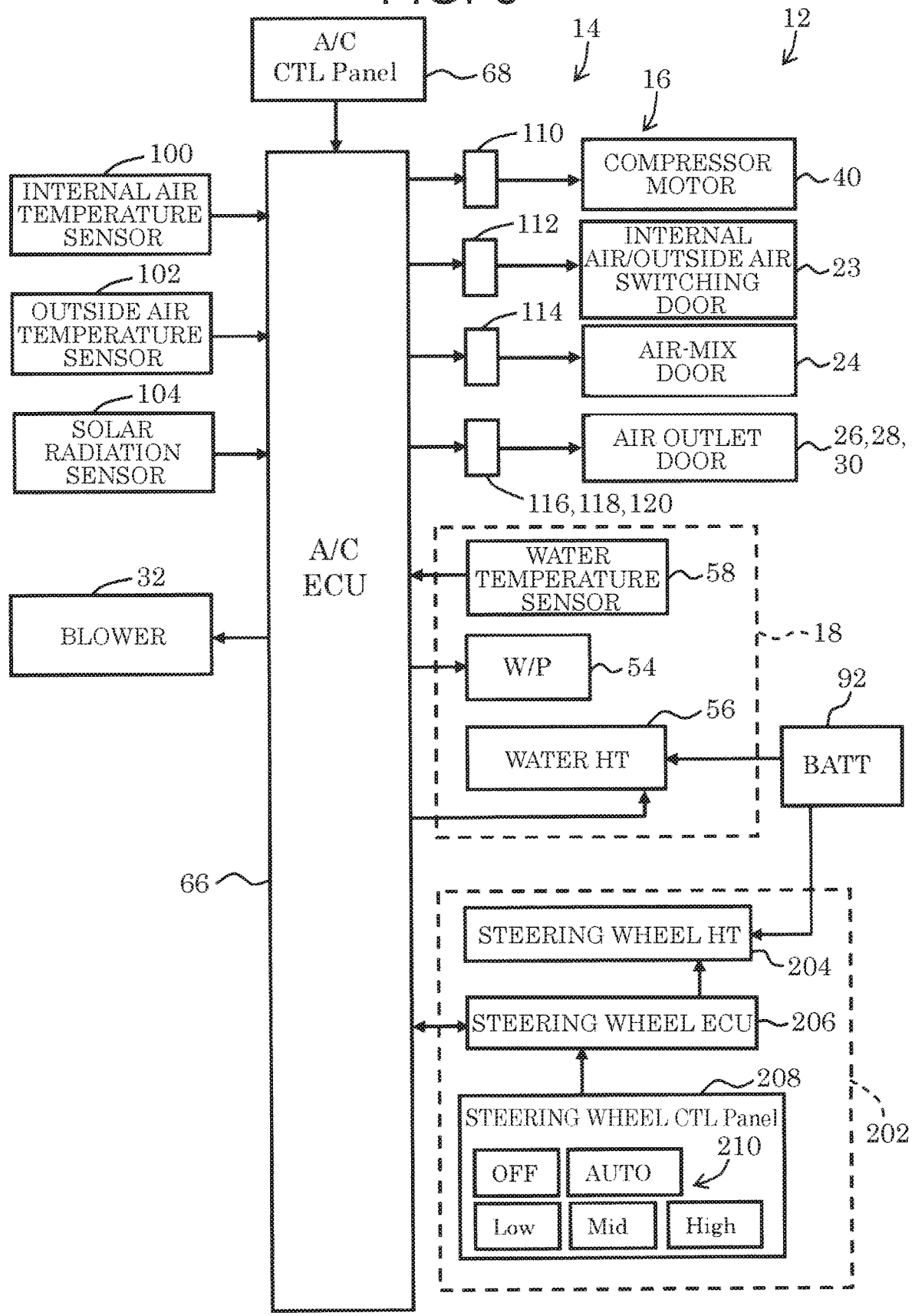
FIG. 8 is a block diagram that shows the electrical configuration of the heating apparatus of the another embodiment.

Here, an embodiment of the heating apparatus 12 in which the contact heating unit is the steering wheel heating unit 202 will be simply described. FIG. 7 is a diagram equivalent to FIG. 1 described above and differs from FIG. 1 in that an electric power is not supplied from the battery 92 to a seat heater and an electric power is supplied from the battery 92 to a steering wheel heater 204 disposed in a steering wheel 200. FIG. 8 is a diagram equivalent to FIG. 3 described above and differs from FIG. 3 in that the seat heating unit 74 is not provided and the steering wheel heating unit 202 is provided. As shown in FIG. 8, the steering wheel heating unit 202 includes the steering wheel heater 204, a steering wheel ECU 206, and a steering wheel control panel 208. The steering wheel ECU 206 has a similar configuration and functions to those of the seat ECU 82 (see FIG. 3). The steering wheel control panel 208 includes "OFF", "AUTO", "Low", "Mid", and "High" switches 210 for an occupant to control the steering wheel heater 204 and has a similar configuration and functions as those of the seat control panel 86.

The steering wheel ECU 206 changes the amount of heat generated by the steering wheel heater 204 by changing the electric power that is supplied to the steering wheel heater 204 based on operating information that is input from the steering wheel control panel 208. The steering wheel ECU 206 is connected to the air conditioner ECU 66 and is able to exchange information with the air conditioner ECU 66.

In the thus configured heating apparatus 12, the air conditioner ECU 66 executes a similar control process to the above-described flow of FIG. 4. At this time, instead of checking "whether the seat heater is on" in S112 of the flow of FIG. 4, "whether the steering wheel heater is on" is checked.

With the thus configured heating apparatus 12 as well, the electric power that is supplied to the water heater 56 (heat source) of the air heating unit 18 when the steering wheel heater 204 (heat source) of the steering wheel heating unit 202 (contact heating unit) is on is decreased as compared to the electric power that is supplied to the water heater 56 (heat source) of the air heating unit 18 when the steering wheel heater 204 of the steering wheel heating unit 202 is off. Therefore, the electric power consumption of the battery 92 is reduced. When the electric power that is supplied to the water heater 56 is decreased in this way, the temperature of air conditioning air to be sent into the vehicle cabin decreases and the vehicle cabin temperature also decreases; however, heat can be input to the occupant because the steering wheel heater 204 is on, so the comfortable warm feeling of the occupant is maintained.

Figure 10:
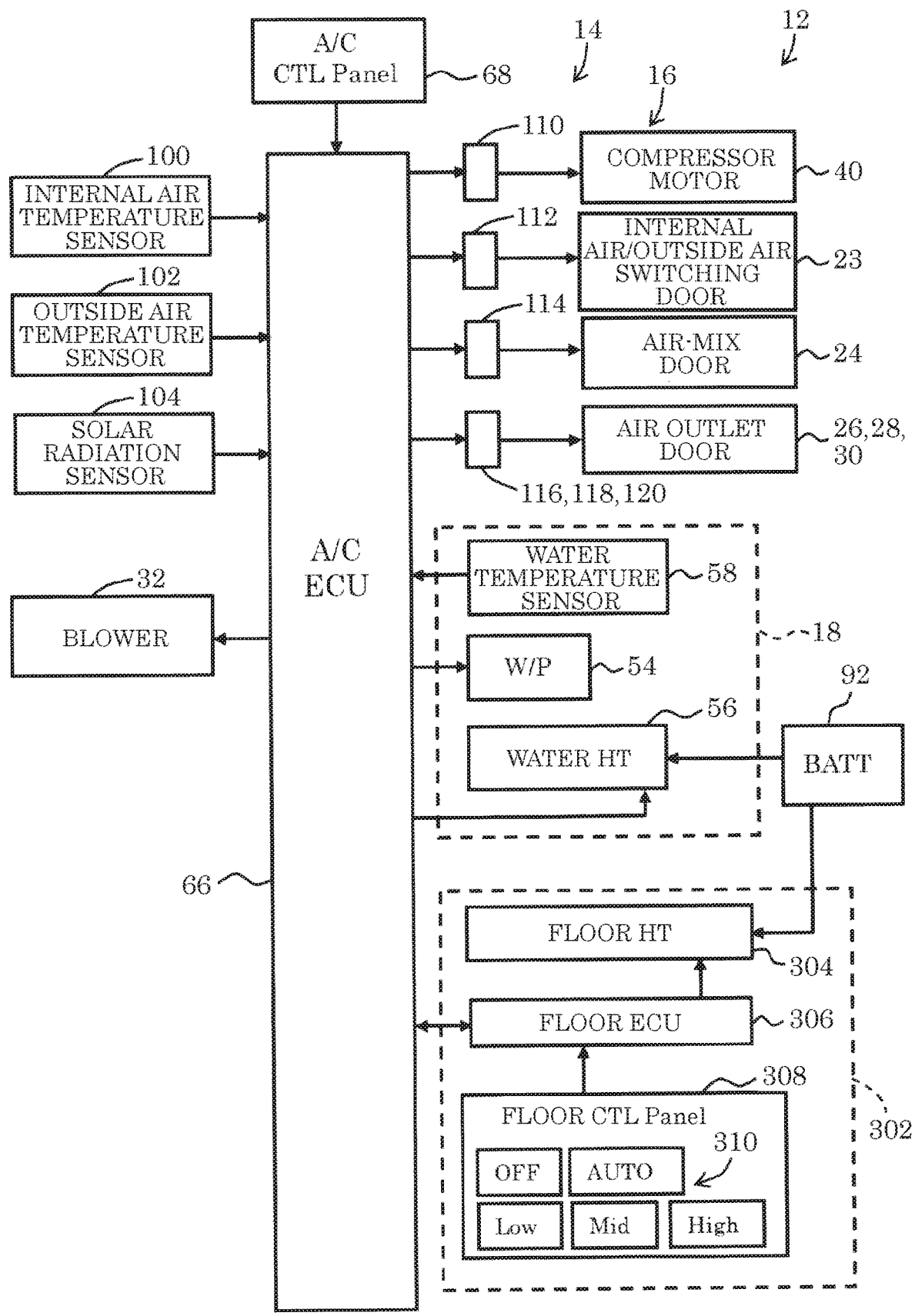
FIG. 10 is a block diagram that shows the electrical configuration of the heating apparatus of the yet another embodiment.

Next, an embodiment of the heating apparatus 12 in which the contact heating unit is the floor heating unit 302 will be simply described. FIG. 9 is a diagram equivalent to FIG. 1 described above and differs from FIG. 1 in that an electric power is not supplied from the battery 92 to a seat heater and an electric power is supplied from the battery 92 to a floor heater 304 disposed under a floor 300. FIG. 10 is a diagram equivalent to FIG. 3 described above and differs from FIG. 3 in that the seat heating unit 74 is not provided and the floor heating unit 302 is provided. As shown in FIG. 10, the floor heating unit 302 includes the floor heater 304, a floor ECU 306, and a floor control panel 308. The floor ECU 306 has a similar configuration and functions to those of the seat ECU 82 (see FIG. 3). The floor control panel 308 includes "OFF", "AUTO", "Low", "Mid", and "High" switches 310 for an occupant to control the floor heater 304 and has a similar configuration and functions as those of the seat control panel 86.

The floor ECU 306 changes the amount of heat generated by the floor heater 304 by changing the electric power that is supplied to the floor heater 304 based on operating information that is input from the floor control panel 308. The floor ECU 306 is connected to the air conditioner ECU 66 and is able to exchange information with the air conditioner ECU 66.

In the thus configured heating apparatus 12, the air conditioner ECU 66 executes a similar control process to the above-described flow of FIG. 4. At this time, instead of checking "whether the seat heater is on" in S112 of the flow of FIG. 4, "whether the floor heater is on" is checked.

With the thus configured heating apparatus 12 as well, the electric power that is supplied to the water heater 56 (heat source) of the air heating unit 18 when the floor heater 304 (heat source) of the floor heating unit 302 (contact heating unit) is on is decreased as compared to the electric power that is supplied to the water heater 56 (heat source) of the air heating unit 18 when the floor heater 304 of the floor heating unit 302 is off. Therefore, the electric power consumption of the battery 92 is reduced. When the electric power that is supplied to the water heater 56 is decreased in this way, the temperature of air conditioning air to be sent into the vehicle cabin decreases and the vehicle cabin temperature also decreases; however, heat can be input to the occupant because the floor heater 304 is on, so the comfortable warm feeling of the occupant is maintained.

The above-described vehicles 10 of FIG. 1, FIG. 7, and FIG. 9 are the vehicles 10 in which the seat heating unit 74, the steering wheel heating unit 202, or the floor heating unit 302 (floor heating apparatus) is selectively provided. Alternatively, the vehicle 10 may be provided with a combination of any two or more of the seat heating unit 74, the steering wheel heating unit 202, and the floor heating unit 302 (floor heating apparatus). In this case, for example, only when the contact heating units equal to or greater than a predetermined number are on, the electric power that is supplied to the water heater 56 may be decreased by correcting a target water temperature of the air heating unit 18 such that the target water temperature decreases.

The above-described heating apparatus 12 is mounted on a vehicle. Alternatively, the heating apparatus 12 may be mounted on a mobile unit other than a vehicle. For example, the heating apparatus 12 having the above-described configuration is mounted on an air plane. In this case, for example, an electric power that is supplied to a heat source of an air heating unit of an air conditioner that sends air conditioning air into a cabin of the air plane when a heat source of a contact heating unit, such as a seat heating unit and a floor heating unit, provided in the cabin is on as compared to an electric power that is supplied to the heat source of the air heating unit when the heat source of the contact heating unit is off. Alternatively, for example, the heating apparatus 12 having the above-described configuration is mounted on an electric train. In this case, for example, an electric power that is supplied to a heat source of an air heating unit of an air conditioner that sends air conditioning air into the electric train when a heat source of a contact heating unit, such as a seat heating unit and a floor heating unit, provided in the electric train is on as compared to an electric power that is supplied to the heat source of the air heating unit when the heat source of the contact heating unit is off. A mobile unit is not limited to a vehicle, an air plane, or an electric train and may be any one of vehicles of various types, that move while being loaded with a person, an animal, or the like.

As an example, an electric power that is supplied from one battery is described above. However, an electric power may be supplied from two or more batteries. For example, a heat source of an air heating unit and a heat source of a contact heating unit each may be supplied with an electric power from two or more batteries. The vehicle 10 may be an electric motor vehicle that is driven by using an electric power supplied from one or more batteries. Moreover, batteries that supply an electric power to the heat source of the air heating unit, batteries that supply an electric power to the heat source of the contact heating unit, and batteries that supply an electric power to drive the vehicle may be the same batteries, or may be different batteries.

Instructions for executing the functions described in the above-described embodiment are stored in a non-transitory readable storage medium, and the functions can be implemented when one or plurality of processors execute the instructions.

What is claimed is:

1. A heating apparatus for a vehicle, the heating apparatus comprising:
   an air heating unit configured to heat air conditioning air to be sent into a vehicle cabin;
   a contact heating unit configured to heat a member that is in contact with a body of an occupant in the vehicle cabin; and
   an electronic control unit, wherein:
   a heater of the air heating unit and a heater of the contact heating unit each are supplied with an electric power from one or more batteries; and the electronic control unit is configured to:
decrease an electric power that is supplied to the heater of the air heating unit when the heater of the contact heating unit is on to reduce an electric power consumption from the one or more batteries as compared to an electric power that is supplied to the heater of the air heating unit when the heater of the contact heating unit is off;
decrease a target water temperature of the air heating unit when the contact heating unit is on;
decrease a total electric power of the electric power that is supplied to the heater of the contact heating unit and the electric power that is supplied to the heater of the air heating unit when the heater of the contact heating unit is on as compared to the electric power that is supplied to the heater of the air heating unit when the heater of the contact heating unit is off and
decrease the electric power that is supplied to the heater of the air heating unit as an outside air temperature outside the vehicle increases.

2. The heating apparatus according to claim 1, wherein the electronic control unit is configured to decrease the electric power that is supplied to the heater of the air heating unit as the electric power that is supplied to the heater of the contact heating unit increases.

3. The heating apparatus according to claim 1, wherein:
the air heating unit is a hot-water heating unit configured to heat the air conditioning air as a result of passage of the air conditioning air around a heater core that is supplied with hot water; and
the hot-water heating unit is a water heater configured to heat water and supply the hot water.

4. The heating apparatus according to claim 3, wherein the electronic control unit is configured to adjust an electric power that is supplied to the water heater such that a water temperature of the hot water when the heater of the contact heating unit is on is lower than a water temperature of the hot water when the heater of the contact heating unit is off.

5. The heating apparatus according to claim 1, wherein the contact heating unit is a seat heater configured to heat a seat that is in contact with the body of the occupant.

6. The heating apparatus according to claim 1, wherein the contact heating unit is a steering wheel heater configured to heat a steering wheel that is in contact with a hand of the occupant.

7. The heating apparatus according to claim 1, wherein the contact heating unit is a floor heater configured to heat a floor that is in contact with a foot of the occupant.

8. The heating apparatus according to claim 1, wherein the vehicle is an electric motor vehicle that is driven by using an electric power supplied from the one or more batteries.

9. A method of controlling a heating apparatus for a vehicle, the method comprising:
determining a heater of an air heating unit configured to heat air conditioning air to be sent into a vehicle cabin is on;
determining whether a heater of a contact heating unit configured to heat a member that is in contact with a body of an occupant in the vehicle cabin is on or off;
decreasing an electric power that is supplied to the heater of the air heating unit when the heater of the contact heating unit is on to reduce an electric power consumption from one or more batteries as compared to an electric power that is supplied to the heater of the air heating unit when the heater of the contact heating unit is off;
decreasing a target water temperature of the air heating unit when the contact heating unit is on;
decreasing a total electric power of the electric power that is supplied to the heater of the contact heating unit and the electric power that is supplied to the heater of the air heating unit when the heater of the contact heating unit is on as compared to the electric power that is supplied to the heater of the air heating unit when the heater of the contact heating unit is off; and
decreasing the electric power that is supplied to the heater of the air heating unit as an outside air temperature outside the vehicle increases.

10. The method according to claim 9, further comprising decreasing the electric power that is supplied to the heater of the air heating unit as the electric power that is supplied to the heater of the contact heating unit increases.

11. The method according to claim 9, wherein:
the air heating unit is a hot-water heating unit configured to heat the air conditioning air as a result of passage of the air conditioning air around a heater core that is supplied with hot water;
the heater of the hot-water heating unit is a water heater configured to heat water and supply the hot water; and
the method further comprises adjusting an electric power that is supplied to the water heater such that a water temperature of the hot water when the heater of the contact heating unit is on is lower than a water temperature of the hot water when the heater of the contact heating unit is off.

12. A non-transitory storage medium storing instructions that are executable by one or more processors and that cause the one or more processors to perform functions comprising:
determining a heater of an air heating unit configured to heat air conditioning air to be sent into a vehicle cabin is on;
determining whether a heater of a contact heating unit configured to heat a member that is in contact with a body of an occupant in the vehicle cabin is on or off;
decreasing an electric power that is supplied to the heater of the air heating unit when the heater of the contact heating unit is on to reduce an electric power consumption from one or more batteries as compared to an electric power that is supplied to the heater of the air heating unit when the heater of the contact heating unit is off;
decreasing a target water temperature of the air heating unit when the contact heating unit is on;
decreasing a total electric power of the electric power that is supplied to the heater of the contact heating unit and the electric power that is supplied to the heater of the air heating unit when the heater of the contact heating unit is on as compared to the electric power that is supplied to the heater of the air heating unit when the heater of the contact heating unit is off; and
decreasing the electric power that is supplied to the heater of the air heating unit as an outside air temperature outside the vehicle increases.

13. The heating apparatus according to claim 1, wherein when the occupant actively turns on the heater of the contact heating unit, the electric power consumption of the one or more batteries is reduced.

14. The method according to claim 9, further comprising the step of:
reducing the electric power consumption of the one or more batteries when the occupant actively turns on the heater of the contact heating unit.

15. The non-transitory storage medium of claim 12 that further causes the one or more processors to perform functions comprising:
reducing the electric power consumption of the one or more batteries when the occupant actively turns on the heater of the contact heating unit.

* * * * *

UNITED STATES PATENT AND TRADEMARK OFFICE
CERTIFICATE OF CORRECTION

PATENT NO. : 11,964,540 B2
APPLICATION NO. : 16/891747
DATED : April 23, 2024
INVENTOR(S) : Tsukagishi et al.

It is certified that error appears in the above-identified patent and that said Letters Patent is hereby corrected as shown below:

On the Title Page

Item (73) Should read: Toyota Jidosha Kabushiki Kaisha

Signed and Sealed this
Twenty-fifth Day of June, 2024

Katherine Kelly Vidal
*Director of the United States Patent and Trademark Office*